United States Patent [19]

Ragland et al.

[11] 3,736,410

[45] May 29, 1973

[54] HAND HELD APPARATUS FOR SENSING DATA BITS CARRIED ON A SHEET

[75] Inventors: Evan L. Ragland, Atherton; Robert D. Carlson, Danville, both of Calif.

[73] Assignee: American Regitel Corporation, San Carlos, Calif.

[22] Filed: Dec. 6, 1971

[21] Appl. No.: 205,073

[52] U.S. Cl...235/61.11 E, 250/219 DC, 179/90 CL, 235/61.7 B

[51] Int. Cl.......G01n 21/30, G06k 7/14, H04m 1/26

[58] Field of Search ......................250/220 M, 219 D, 250/219 DC, 213 A, 211 J; 235/61.11 E, 61.11 F, 61.7 B, 61.11 D; 340/146.3 F, 149 A; 179/90 CL; 331/94.5; 315/169

[56] References Cited

UNITED STATES PATENTS

| | | | |
|---|---|---|---|
| 3,328,589 | 6/1967 | Ferguson | 250/219 D |
| 3,419,710 | 12/1968 | Mathews | 235/61.11 D |
| 3,536,894 | 10/1970 | Travioli | 250/219 DC |
| 3,245,002 | 4/1966 | Hall | 331/94.5 |
| 3,558,974 | 1/1971 | Stewart | 315/169 |
| 3,501,676 | 3/1970 | Adler | 315/169 |
| 2,986,591 | 5/1961 | Swanson | 250/211 J |
| 3,639,729 | 2/1972 | Marshall | 235/61.11 E |
| 3,443,109 | 5/1969 | Broom | 250/219 DC |
| 3,461,303 | 8/1969 | Hanson | 250/219DC |
| 3,665,164 | 5/1972 | Beveridge | 235/61.11 E |

*Primary Examiner*—Thomas A. Robinson
*Assistant Examiner*—Robert M. Kilgore
*Attorney*—Paul D. Flehr, Harold C. Hohbach and Aldo J. Test et al.

[57] ABSTRACT

A compact, hand held punch-hole-code ticket reader includes a matrix of light emitting diodes lying in a plane with a substantially planar large area photo-voltaic detector of unitary construction juxtaposed, parallel and coextensive with the light emitting diodes. A ticket is inserted between the diodes and detector. The diodes are scanned or sequentially activated and the detector provides a serial data output.

9 Claims, 10 Drawing Figures

HAND HELD APPARATUS FOR SENSING DATA BITS CARRIED ON A SHEET

BACKGROUND OF THE INVENTION

The present invention is directed to hand held apparatus for sensing data bits which are carried on a sheet and more particularly, to a reader for reading hole punched paper tickets.

In department stores and discount houses, it is desired to speed up transactions by automatically sensing price and merchandising information from price tags in the form of a punched hole coded paper ticket. In the past, ticket readers have been provided but they have been bulky and inefficient. For example, one type of reader utilized a single light source positioned at a distance from the punched ticket. On the other side of the ticket were detectors positioned behind each possible position in the matrix or array of holes. Each detector was examined in sequence. Thus, the entire light source energy was distributed over the entire array. This required a large input power. Also the apparatus was of a large size because of the distance of the light source from the ticket.

OBJECTS AND SUMMARY OF THE INVENTION

It is, therefore, a general object of the invention to provide an improved hand held apparatus for sensing data bits carried on a sheet.

It is another object of the invention to provide apparatus as above which is compact in size and efficient in operation.

In accordance with the above objects there is provided apparatus for sensing data bits carried on a sheet and arranged in a predetermined matrix. The bits are discrete areas on the sheet having significantly different light transmission characteristics compared to the sheet. A plurality of discrete light emitters are arranged in the matrix. Means are provided for locating the matrix of the areas of the sheet in coincidence with the matrix of the light emitters. The plurality of light emitters are sequentially activated. A large area photovoltaic detector is juxtaposed with the plurality of light emitters for receiving light transmitted through an area of the sheet from only a single coincident activated light emitter to produce an output signal.

DETAILED DESCRIPTION OF THE PREFERRED EMBODIMENT

Figure 2:
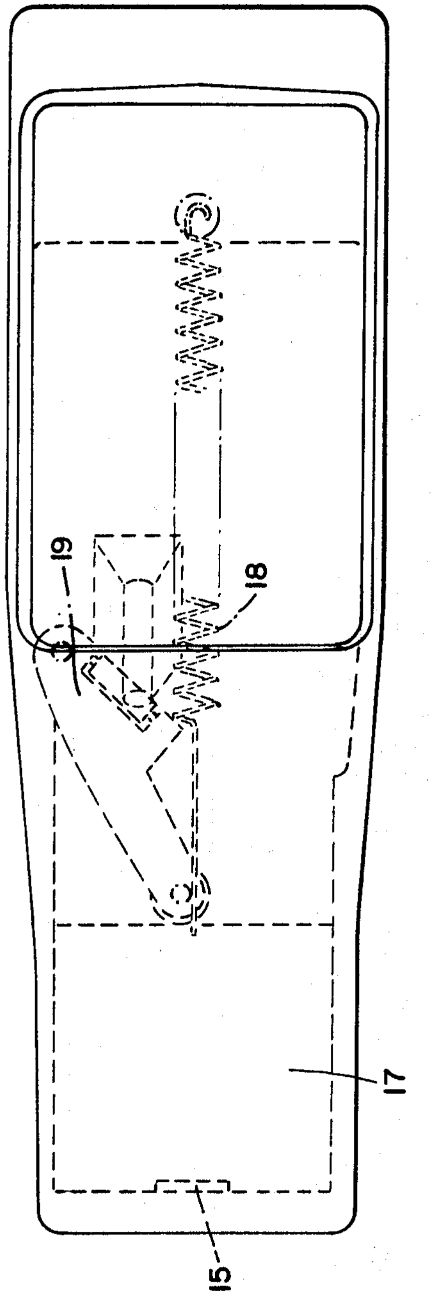
FIG. 2 is a top view of FIG. 1 showing in phantom and dashed outline portions of operating parts of the device.
Figure 1:
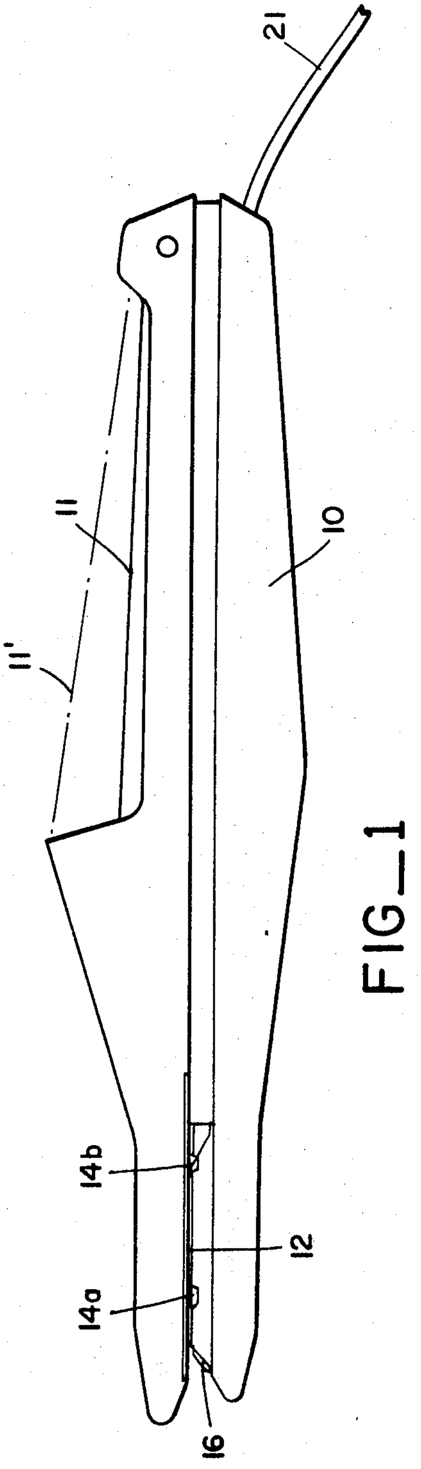
FIG. 1 is a side view of hand held apparatus embodying the present invention.

FIG. 1 illustrates the ticket reader in an operated condition. It includes a casing 10 and a hand actuated lever 11. A ticket 12 which is to be read is inserted in the end of the device. The ticket would typically be of the Kimball or Dennison type with punched holes and is retained in the reader by three alignment pins **14*a–c* (two of which are illustrated) and an optional pressure spring 16. To insert ticket 12, a photovoltaic reading head indicated in FIG. 2 at 17 is retracted by allowing the actuating lever 11 to return to its unoperated position shown in dashed line at 11'. After insertion, the handle is moved to its operative position and the photovoltaic carrier 17 is thereby moved to the position illustrated in FIG. 2. The start switch 15 is thereby activated and further head travel prevented. The carrier is spring biased back toward its inoperative position by spring 18 and coupled to the lever 11 by the actuating mechanism 19** shown in phantom outline.

Figure 5:
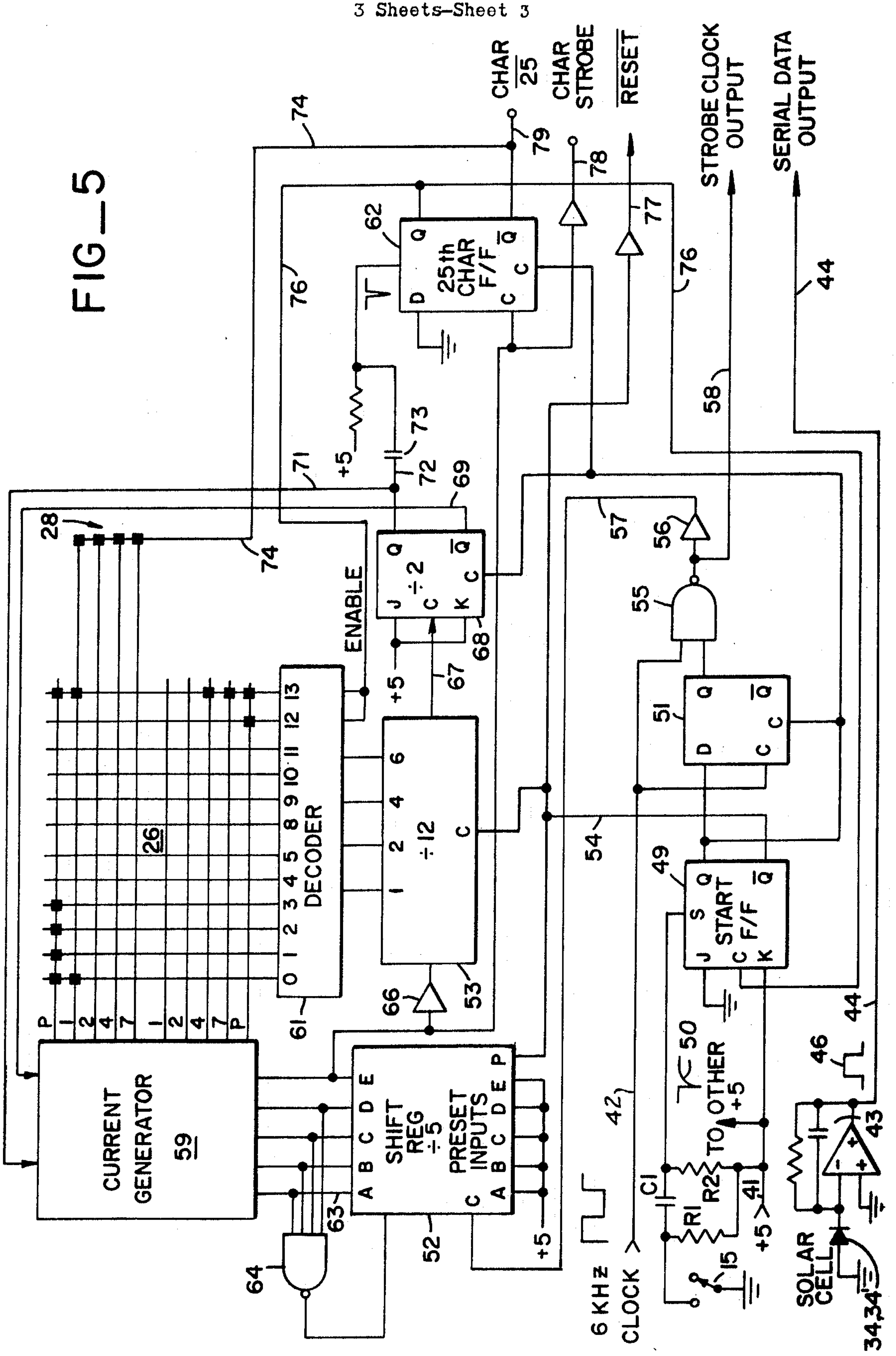
FIG. 5 is a block diagram of the electrical circuits contained within the apparatus of FIG. 1.

The hand-held apparatus in FIG. 1 is coupled to an electronic cash register or a point of sales transaction terminal by an electrical cord 21 which supplies and receives signals as will be set out in greater detail in conjunction with the circuit block diagram of FIG. 5.

Figure 3:
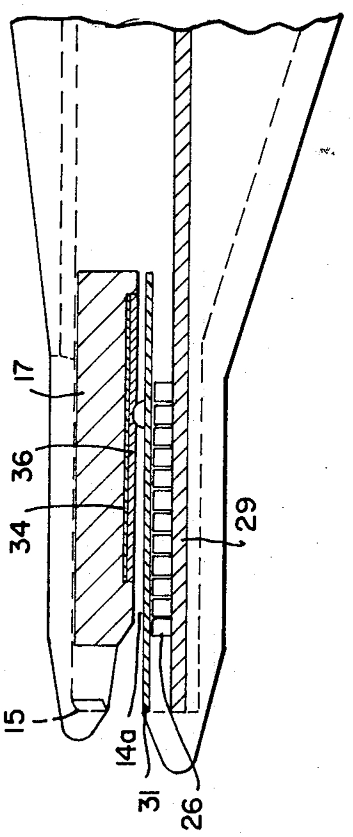
FIG. 3 is an enlarged cross-sectional view of the left end portion of FIG. 1 which has been inverted.
Figure 4A:
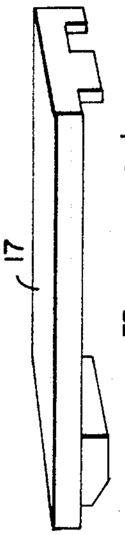
FIGS. 4A through 4F are an exploded perspective view of portions of FIG. 3.
Figure 4B:
Figure 4C:
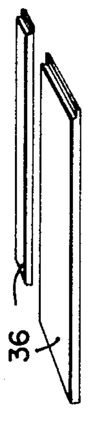
Figure 4D:
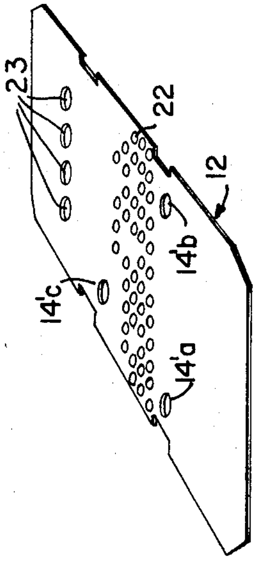
Figure 4E:
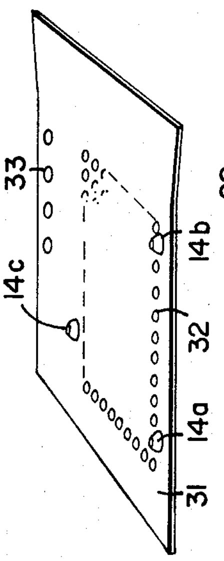
Figure 4F:
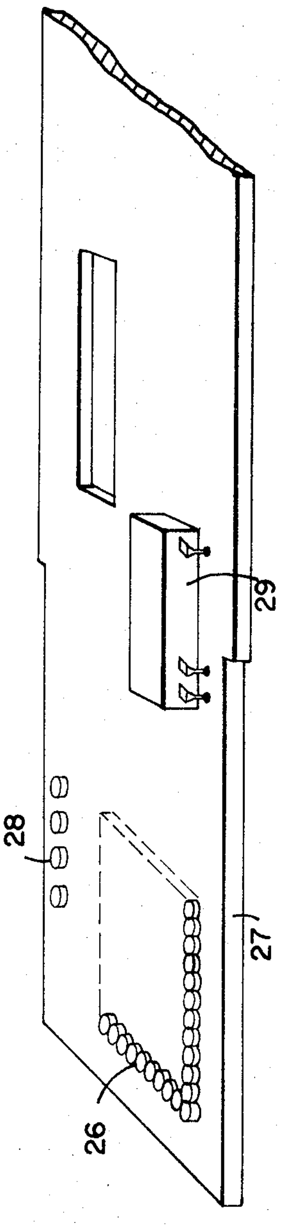

FIG. 3 illustrates in greater detail the end portion of FIG. 1 in an inverted form and without a ticket 12 inserted, Referring now also to FIGS. 4A through 4F which are an exploded perspective view of FIG. 3, the ticket 12 (FIG. 4D) which is normally on the merchandise which is being sold contains standard locator holes **14*a'*, 14*b'* and 14*c'* which match alignment pins 14*a–c*. In addition, it contains a matrix of hole positions or hole sites 22 having coded information such as price, stock number, etc. In addition, the four holes at 23** provide source information to determine what organization actually prepared the punched paper ticket.

The hole sites 22 are arranged in a predetermined matrix. This matrix is duplicated by a plurality of discrete light emitters 26 (FIG. 4F) which are in the form of light emitting diodes mounted on an insulating base or printed circuit board 27. In the case of a typical Kimball type paper ticket, this matrix would be $10 \times 12$ array. In addition, light emitting diodes 28 provide for the reading of the holes 23 for the source markers. Board 27 also contains appropriate integrated circuitry 29 which will be discussed in conjunction with FIG. 5. Alignment pins **14*a–c* are mounted on an aluminum plate 31 (FIG. 4B) in which are drilled or etched a matrix of light apertures 32 to match the matrix of the light emitting diodes 26 and the matrix of the punched holes 22 on the ticket itself. Also included are four holes 33 for the source marker light emitting diodes 28. This plate is mounted directly over the light emitting diodes 26**.

A large area photovoltaic detector 34 is juxtaposed with light emitting diodes 26 for receiving light transmitted through any of the punched holes 22 of the ticket. Detector 34 is a typical solar cell type silicon PN semiconductor diode which is a single sheet. The area covers all of the light emitters 26 and it is responsive to the activation of any single light emitter by itself, with no other light emitter being activated, to provide an output signal when there is a punched hole coincident with that activated light emitter. Detector 34 includes an auxiliary sheet 34', electrically connected in parallel, which is for the purpose of receiving the source marker information through the punched holes 23 from light emitting diode 28. The gap 35 between the sheets allows for passage of alignment pin **14*c* when carrier 17 is retracted. Detectors 34 and 34' are bonded to protective glass sheet 36 and the sandwiched construction is mounted in a carrier slide unit 17, the slide moving as discussed above or being retractable to allow insertion of the ticket 12**.

Although in the preferred embodiment a Kimball or Dennison type punched ticket is utilized with punched holes to allow the transmission of light from the light emitters 26 to the large area photovoltaic detector, other types of coded information may be read where inputed information is provided on a sheet and the coded information is in the form of discrete areas having a significantly different light transmission characteristic compared to the remainder of the sheet. For example, film negatives might contain information in the form of relatively less opaque areas. In addition, information might be contained on a sheet in such a form that, for example, the coded areas would provide a relatively greater transmission for certain wavelengths of light, for example, infrared, and the remainder of the sheet would absorb such light wavelength.

In actual practice, the light emitters 26 are preferably of the infrared type and composed of gallium arsenide. Light emitters of this type are found to provide a large energy output at 9,100 angstroms. Moreover, the photovoltaic cell 34 of silicon construction has its major sensitivity peak near this frequency of 9,100 angstroms. Thus, with the use of the large area silicon photovoltaic diode which has a great sensitivity at the above frequency which is matched with a light emitting diode (L.E.D.) of the foregoing type having maximum power output at that frequency, the conversion efficiency is maximized as opposed to operating in the visible portion of the spectrum. Moreover, since the large area detector produces a current proportional to the combined intensity and surface area excited, almost the total radiant flux passing through the aperture hole from an L.E.D. is converted, and is not dependent on the distance from the aperture plate.

Referring now to FIG. 5, all of the circuitry shown is an integral portion of the hand apparatus 10 and is contained within that apparatus. Except for the light emitting diodes, and the solar cell it is essentially of integrated circuit construction and mounted on the printed circuit board shown in FIG. 4F. Interconnect cabling 21 coupled to the apparatus supplies a +5 volts on line 41 along with a 6 kilohertz clock pulse on a line 42. The photovoltaic detectors or solar cells 34 and 34' are shown as a single diode since the two cells are connected in parallel. The cells are coupled to an operational amplifier 43 and when activated by illumination from a single infrared light emitting diode produces a pulse on the serial data output line 44 of the type shown at 46. The serial data output consists of 25, five bit characters in the preferred embodiment since the code matrix is normally broken down in this manner. Of course, other character configurations may be used. Start switch 15 which is activated by movement of the photovoltaic carrier to an operative position has one terminal connected to ground and the other terminal to the set terminal "S" of a start flip-flop 49 of the JK type by a differentiator circuit R1, R2 and C1. Switch closure produces a negative pulse on the set input of the type shown at 50. In its normal standby condition, the Q output of flip-flop 49 is at "0" causing flip-flop 51, 68 and 62 to be in the clear or reset state, $\bar{Q}$=1.

In order to insure that the sequencing or activation of the light emitting diodes occurs in synchronization with the clock signal on line 42, the C input (Clocking) of a "D" type flip-flop 51 is coupled to line 42 and its "D" input is coupled to the Q output of flip-flop 49. Flip-flop 51 is set or has its Q output go high to a "1" on the first positive edge of a clocking pulse after the start flip-flop 49 has been set. The setting of the start flip-flop also unlocks a shift register 52 and a divide by 12 counter unit 53 via the zero or low output on the $\bar{Q}$ line 54 which extends to the C (clear) input of divide by 12 unit 53 and the P (all ones preset) input of the shift register 52. The Q output of flip-flop 51 allows the NAND gate 55 to be closed when the coincidence clock pulse arrives. The negative going edge output of gate 55 is coupled to an inverter 56 and to line 57 which in turn is coupled to the C (clock) input of shift register 52 to initiate the operation of that shift register and the sequential activation of the light emitting diodes by the scanner electronics. At the same time, the output of NAND gate 55 is also coupled by a line 58 to the interconnection cord 21 to provide a strobe clock output to provide clocking for the serial data on output line 44.

The light emitting diodes are indicated at 26 and are activated by a signal coincidence at the junction of the diode The horizontal lines of the matrix, designated P, 1, 2, 4, 7 for an upper field and 1, 2, 4, 7, P (P for parity) for a lower field, extend from a current generator 59. The vertical lines of the matrix are grounded by a decoder 61. The 12 vertical output lines are designated 0 through 5 and 8 through 13 with 6 and 7 being eliminated in order to facilitate being driven by the "1, 2, 4, 6" outputs of the divide by 12 unit 53. Actually, decoder 61 is a hexadecimal type decoder of standard configuration, and thus is normally driven by a 1, 2, 4, 8 input.

A single light emitting diode is activated when its anode which is coupled to the current source 59 and its cathode is grounded or placed in a low condition by decoder 61. In addition to the light emitting diodes 26 at the 120 junctions, four light emitting diodes 28 are also coupled to the upper field lines 1, 2, 4 and 7 to provide source marking capability. A single vertical line 74 couples these diodes to a 25th character flip-flop 62 whose operation will be described below.

In operation, as clock pulses are coupled to shift register 52, the first clock pulse's positive going edge produces a low on the A output line 63 which activates the upper field "1" line output of current generator 59. Subsequent clock pulses place lows on the output lines B, C, D and E in sequence to activate the upper field horizontal lines 2, 4, 7 and P. At this time, the zero output line of decoder 61 is in a low condition. Thus, the first five bit character has been scanned. After every five clock pulses, the shift register 52 is reset back to a condition where "A" is low by means of a NAND gate 64 coupled to the output lines A, B, C and D. The trailing edge of this fifth pulse on the E line is coupled to divide by 12 unit 53 through an inverter 66. This increments counting unit 53 by 1 to shift the low in decoder 61 from the zero output vertical matrix line to the "1" vertical line. Thus, the next five bit character in the upper field is scanned. The above operation occurs until the 12th character at which time line 13 of decoder 61 has been activated and placed low. At the end of this period a negative output from divide by 12 counter unit 53 occurs on line 67 which is coupled to the clock input of a flip-flop 68. This in essence serves as a divide by 2 unit since when it is activated or set a high on its Q output line 71 which is coupled to the current generator 59 switches the generator 59 to its lower 5 line horizontal field. The bottom five lines are now activated, and scanning of these lines takes place in the same manner until the last character in the bottom field is reached at which time output line 13 of decoder 61 is activated or placed low. At the end of this 24th character another negative edge clocking pulse occurs on line 67 from divide by 12 unit 53 to switch flip-flop 68 to place a low on its $Q$ output line. This has the effect of coupling a high indication via line 69 to current generator 59 to reactivate the five top field lines. In addition through line 72 and differentiator capacitor 73 the 25th character flip-flop 62 is set. The resulting low on the $\overline{Q}$ output of this flip-flop is coupled by a line 74 to light emitting diodes 28 to provide the vertical activating input to the four light emitting diodes. They are then scanned by the current generator 59 via the upper field horizontal lines 1, 2, 4 and 7. The high ("1") $Q$ output of flip-flop 62 causes all of the outputs of decoder 61 to go high, turning off the 10 × 12 array 26 of 120 diodes.

Thus, the scanning or sequential activation of all of the light emitting diodes has now been accomplished. The trailing edge of the 25th character flip-flop 62 provides a resetting action for the entire circuit since its $Q$ output line 76 is coupled to the clock input of flip-flop 49 to reset the $\overline{Q}$ output to a 1. Reset of this output again places a "1" on line 54 to also reset shift register 52 and divide by 12 unit 53, and the $Q$ output going to a low "0" resets flip-flop 51, turning off clock gate 55.

In order to provide for greater control flexibility in an associated computer, several additional control lines provide control indications that may be coupled via the interconnect line 21. These include a $\overline{\text{reset}}$ line 77 coupled to line 54, a character strobe line 78 coupled to the E output of shift register 52, and a character $\overline{25}$ line 79 coupled to the $\overline{Q}$ output of the 25th character flip-flop. Character strobe information, for example, allows the serial output data to be arranged in parallel five bit character data blocks.

Thus, the present invention has provided an improved ticket reading apparatus which has a small physical size and weight with high efficiency and low temperature rise which makes it ideal for a hand held device. The use of the large area photovoltaic detector in conjunction with the discrete light emitting diodes allows for a very thin profile. In addition, the high efficiency which results from matching the maximum power output of the individual light emitting diodes with the maximum sensitivity of the photovoltaic detector provides for a low temperature rise. The fast response time of the light emitting diodes provides for rapid reading of the ticket.

We claim:

1. Hand held apparatus for sensing data bits carried on a sheet and arranged in a predetermined matrix said bits being discrete areas on said sheet having a significantly different light transmission characteristic compared to said sheet apparatus comprising: a plurality of discrete light emitters arranged in said matrix; means for locating said matrix of said areas of said sheet in coincidence with said matrix of said light emitters; and a unitary large area substantially planar photovoltaic detector juxtaposed and coextensive with said plurality of light emitters for receiving light transmitted through an area of said sheet from only a single coincident activated light emitter and producing an output signal.

2. Apparatus as in claim 1 where said large area photovoltaic means is a solar cell.

3. Apparatus as in claim 1 where said sequential activation means includes clocking means for driving said sequential activation means at a predetermined clock frequency and for providing clocking for said output signal.

4. Apparatus as in claim 1 together with slidable carrier means for carrying said photovoltaic detector into juxtaposition with said light emitters.

5. Apparatus as in claim 1 where said light emitter are diodes of the gallium arsenide type having a significant infrared output at 9,100 A.

6. Apparatus as in claim 5 where said photovoltaic detector is of the silicon PN junction type having relatively great sensitivity at 9,100 A.

7. Apparatus as in claim 1 where said light emitters lie substantially in a single plane, and where said planar detector is parallel to said plane the combination of said light emitter and detector forming a sandwich type construction with said sheet therebetween.

8. Apparatus as in claim 7 where said detector area is much greater than the radiating area of one of said light emitters whereby substantially all emitted light is received by said detector.

9. Apparatus as in claim 1 where the light path between any of said light emitters and said detector is direct and linear whereby no optical focusing is necessary and sheets of varying thickness are easily accommodated.

* * * * *